US006834197B2

(12) United States Patent
Nakahara et al.

(10) Patent No.: US 6,834,197 B2
(45) Date of Patent: Dec. 21, 2004

(54) BASE STATION APPARATUS, MOBILE COMMUNICATION SYSTEM, AND METHOD OF CONTROLLING TRANSMISSION POWER

(75) Inventors: Naruhito Nakahara, Yokohama (JP); Yuuji Ishida, Fujisawa (JP); Naoki Tsubaki, Yokohama (JP); Joichi Saito, Yokohama (JP); Toshinori Suzuki, Tokyo (JP); Yoshio Takeuchi, Oomiya (JP); Sumaru Niida, Irima (JP)

(73) Assignees: Hitachi, Ltd., Tokyo (JP); KDDI Corporation, Tokyo (JP)

( * ) Notice: Subject to any disclaimer, the term of this patent is extended or adjusted under 35 U.S.C. 154(b) by 376 days.

(21) Appl. No.: 09/725,840

(22) Filed: Nov. 30, 2000

(65) Prior Publication Data

US 2001/0019961 A1 Sep. 6, 2001

(30) Foreign Application Priority Data

Mar. 3, 2000 (JP) ........................................ 2000-059104

(51) Int. Cl.⁷ ................................................. H04Q 7/20
(52) U.S. Cl. .......................... 455/522; 455/69; 370/318
(58) Field of Search ........................... 455/522, 69, 517, 455/442, 226.1, 226.3, 13.4, 65, 67.13, 68, 134, 135; 370/318, 320; 375/147, 148, 227, 346, 144

(56) References Cited

U.S. PATENT DOCUMENTS 5,898,740 A * 4/1999 Laakso et al. ............... 375/346

FOREIGN PATENT DOCUMENTS

| EP | 822672 A2 | 2/1998 | |
|---|---|---|---|
| EP | 822672 A3 | 5/2000 | |
| EP | 863618 A3 | 9/2000 | |
| FI | WO 96/07246 | * 3/1996 | ........... H04B/7/005 |
| JP | 0849886 | * 6/1998 | ........... H04B/1/707 |
| JP | 10247894 | 9/1998 | |

* cited by examiner

Primary Examiner—Nay Maung
Assistant Examiner—Tanmay Lele
(74) Attorney, Agent, or Firm—Antonelli, Terry, Stout & Kraus, LLP

(57) ABSTRACT

A base station apparatus, a mobile radio system, and a transmission power control method that can perform transmission power control having the high interference suppressing effect with a smaller processing delay are provided. The base station apparatus comprises: a measurement part for measuring SIRs of a received signal subjected to interference suppression by an interference suppressing receiving circuit in a former stage in an interference suppressing receiving part of the radio base station apparatus, and of a received signal subjected to interference suppression by an interference suppressing receiving circuit in a later stage; a calculation part for calculating a correction SIR based on the obtained SIRs, and for estimating a transmission power control SIR from a current first stage SIR and a past correction SIR; and a signal generator for generating a transmission power control signal by comparing the transmission power control SIR and a target SIR. Control of transmission power of a mobile station is performed by transmitting this transmission power control signal to the mobile station.

9 Claims, 10 Drawing Sheets

Fig.6

| SLOT NO. | FIRST STAGE SIR | LATTER STAGE SIR | CORRECTION ΔSIR |
|---|---|---|---|
| t -1 | 5.0 | 10.2 | +5.2 |
| t | 5.2 | 10.5 | +5.3 |
| t +1 | 5.1 | | |

BASE STATION APPARATUS, MOBILE COMMUNICATION SYSTEM, AND METHOD OF CONTROLLING TRANSMISSION POWER

This application claims a priority based on Japanese Patent Application No. 2000-059104 filed on Mar. 3, 2000, the entire contents of which are incorporated herein by reference for all purposes.

BACKGROUND OF THE INVENTION

1. Field of the Invention

The present invention relates to a mobile communication system and a method of controlling transmission power, and in particular to a base station apparatus, a mobile communication system using the base station apparatus, and a method of controlling transmission power in a cellular mobile communication system utilizing the code division multiple access (hereinafter, referred to as CDMA).

2. Related Art Statement

In the cellular mobile communication system of the CDMA system, a plurality of mobile stations can share the same frequency band to conduct communication with a base station apparatus. However, in this mobile communication system, when a certain mobile station conducts communication with the base station apparatus, a signal (undesired signal) transmitted by another mobile station to the base station apparatus interferes with a signal (desired signal) transmitted by that certain mobile station to the base station apparatus, becoming a disturbance to the communication between the desired mobile station and the base station apparatus. At that time, the interference level becomes larger in proportion to the reception level of the undesired signal received by the base station apparatus. Further, the reception level of the undesired signal is proportional to the transmission power of the transmission from the undesired mobile station. Accordingly, in a mobile communication system of the CDMA system, in order to suppress the interference level to the minimum, it is required that the base station apparatus controls the transmission power of the mobile station, such that the transmission power from the mobile station is received in the base station apparatus always at the necessary but minimum reception level.

As the conventional technique of such a method of controlling transmission power, is known a method called the closed loop power control. A base station apparatus that performs this method of controlling transmission power measures reception quality such as a Signal-to-Interference Ratio (hereinafter, referred to as a SIR value) of a reverse link channel, received power, etc., and compares the measured reception quality with desired target values decided by the system. Then, based on the results of the comparison, the base station apparatus prepares a transmission power control signal for instructing the mobile station to increase or decrease the transmission power, and adds that signal to a frame of transmit data for transmission to the mobile station. On receiving the transmission power control signal, the mobile station controls the transmission power in accordance with the instruction of increasing or decreasing. By repeating this control, the reception quality level at the base station apparatus can be converged to the target values.

Further, in recent years, methods of suppressing interference generated in the course of despreading a code-multiplexed signal for detecting the desired signal are attracting attention. This interference is generated owing to cross-correlation of respective spread codes assigned to mobile stations. As one method of suppressing interference, is proposed an interference suppressor for a multi-user reception system.

In the multi-user reception system, all the user signals are once demodulated in the first stage, to generate an interference replica of each user. Then, the interference replicas of the users other than the user in question are subtracted from the received input signal to suppress the interference. In the next stage, this signal from which the interference is suppressed is used for repeating demodulation of the user signal as the desired signal. By such operation, the signal as the result of the two-stage demodulation is improved in signal quality than the result of the demodulation in the first stage. By using such configuration in multiple stages and by repeating a series of processing a plurality of times, interference can be suppressed.

As such a method of controlling transmission power, is mentioned the technique described in Japanese Unexamined Patent Laid-Open No. 10-247894. According to 10-247894, the received signal is used for measuring each user's SIR value, after the received signal passes through all the interference suppressing receiving part consisting of multistage interference suppressing receiving circuits. Then, that SIR value and a predetermined target SIR value are compared by a comparator circuit, and the result of comparison is added as transmission power control bits to a transmit frame before transmission to the mobile station.

The above-described conventional technique has a problem that the interference suppressing effect can not be sufficiently obtained.

This will be described in detail. In 10-247894, the control of transmission power is performed using the SIR value of the signal that has passed the interference suppressing receiving circuit in the last stage. As a result, processing delay due to the multi-stage interference suppressing receiving circuits becomes large, and it takes a lot of time to generate a transmission power control signal after receiving the reception signal through an antenna. Accordingly, error in controlling the transmission power becomes large. When, the transmission power becomes larger than the desired level for a receiver, interference with another mobile station increases.

On the other hand, it is considered that, in order to decrease the processing delay, the transmission power control is performed using the SIR value of the signal that has passed the interference suppressing circuit in the first stage. In the case that the SIR value of the signal that has passed the interference suppressing circuit in the first stage is used, time between the reception of the received signal and the measurement of the SIR value can be shortened. However, the output of the interference suppressing circuit in the first stage does not sufficiently reflect the interference suppressing effect. Thus, there arises a case that, even when the communication can be conducted with reduced transmission power of each mobile station within the system, it is not possible to control each mobile station to decrease its transmission power. Further, this method has a problem of inefficiency since transmission power is controlled using a signal that has not undergone sufficient interference suppressing effect.

SUMMARY OF THE INVENTION

An object of the invention is to provide a base station apparatus, a mobile communication system, and a method of controlling transmission power, that can solve the above-described problems of the conventional technique, and can control transmission power with better interference suppressing effect and smaller processing delay.

To that end, the present invention provides a base station apparatus in a mobile communication system including a plurality of mobile stations and a plurality of base station apparatuses each having an interference suppressing receiving part containing interference suppressing circuits in a plurality of stages, the base station apparatus comprising: a means for calculating a correction SIR value based on a SIR value measured from a received signal subjected to interference suppression by an interference suppressing receiving circuit in a former stage in the interference suppressing receiving part and an SIR value of the received signal subjected to interference suppression by an interference suppressing receiving circuit in a later stage; a means for estimating a transmission power control SIR value based on the calculated correction SIR value; a means for generating a transmission power control signal using the estimated transmission power control SIR value; and a transmission power control means for adding the generated transmission power control signal to a downlink frame, to control transmission power of a mobile station.

Particularly, the correction SIR value is calculated by subtracting the former stage SIR value from the later stage SIR value, or by taking an average from integral of a difference between the later stage SIR value and the former stage SIR value in a certain cycle.

More particularly, the transmission power control SIR value is calculated by subtracting the correction SIR value from the former stage SIR value; and the transmission power control signal is generated based on a result of comparison between the transmission power control SIR value and a target SIR value.

Further, the former stage SIR value is an SIR value measured based on the received signal outputted from one of interference suppressing receiving circuits in the first stage through a stage preceding the last stage of the interference suppressing receiving part containing interference suppressing circuits in a plurality of stages.

As another configuration, the present invention provides a base station apparatus in a mobile communication system including a plurality of mobile stations and a plurality of base station apparatuses each having an interference suppressing receiving part containing interference suppressing circuits in a plurality of stages, the base station apparatus comprising: a means for calculating a correction SIR value based on a SIR value measured from a received signal subjected to interference suppression by an interference suppressing receiving circuit in a former stage in the interference suppressing receiving part and an SIR value of the received signal subjected to interference suppression by an interference suppressing receiving circuit in a later stage; a means for estimating a corrected target SIR value based on the calculated correction SIR value; a means for generating a transmission power control signal using the estimated correction target SIR value; and a transmission power control means for adding the generated transmission power control signal to a downlink frame, to control transmission power of a mobile station.

Particularly, the correction SIR value is calculated by subtracting the former stage SIR value from the later stage SIR value, or by taking an average from integral of a difference between the later stage SIR value and the former stage SIR value in a certain cycle.

More particularly, the corrected target SIR value is calculated by subtracting the correction SIR value from a target SIR value; and the mentioned transmission power control signal is generated based on a result of comparison between the former stage SIR value and the corrected target SIR value, so that the mentioned cycle of averaging is shorter than a cycle of transmission power control operation between the base station apparatus and a base station controller.

As still another configuration, the present invention provides a mobile communication system comprising a plurality of mobile stations and a plurality of base station apparatuses each having an interference suppressing receiving part containing interference suppressing circuits in a plurality of stages, with each base station apparatus being provided with the above-mentioned means.

Further, the above-described object is attained in the above-described mobile communication system by using a CPU and a software memory in the base station apparatus, in order to implement the means for calculating a correction SIR value and the means for calculating the transmission power control SIR value, or by using a CPU and a software memory, in order to implement the means for calculating the corrected target SIR value.

BRIEF DESCRIPTION OF THE DRAWINGS

Preferred embodiments of the present invention will now be described in conjunction with the accompanying drawings, in which:

FIG. 6 explains structure of an SIR table memory of the SIR estimating part for transmission power control;

DETAILED DESCRIPTION

Now, embodiments of the mobile communication system and method of controlling transmission power according to the present invention will be described in detail.

Figure 1:
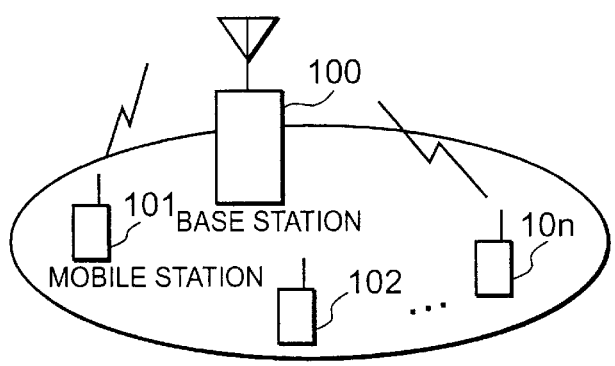
FIG. 1 shows a configuration of a mobile communication system to which the present invention is applied.

As shown in FIG. 1, a mobile communication system to which the present invention is applied comprises a radio base station apparatus 100 and a plurality of mobile stations 101–10n. Here, FIG. 1 shows only one radio base station apparatus and a plurality of mobile stations existing within a service area (cell) of this radio station apparatus. However, in an actual mobile communication system, many radio base station apparatuses are arranged such that each can conduct communication with many mobile stations within its cell. Further, each of the radio base station apparatuses is connected to a public communication network via a base station controller and an exchange control station.

Now, it is assumed that, in a cellular mobile communication system shown in FIG. 1, the mobile stations 101–10n exist within the same cell, and the base station apparatus 100 conducts communication with the mobile station 101. Although the radio base station apparatus 100 conducts communication with the mobile station 101, it also conducts communication with the other mobile stations 102–10n. In that case, for the communication between the radio base station apparatus 100 and the mobile station 101, transmit signals of the other mobile stations 102–10n become interference sources in CDMA.

Figure 2:
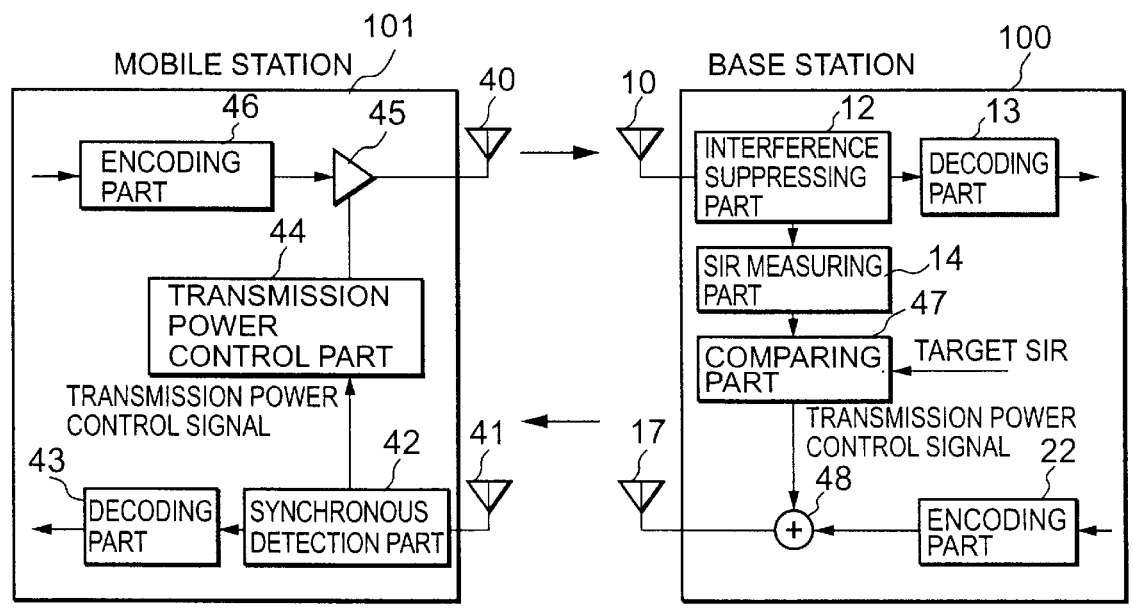
FIG. 2 is a block diagram showing configurations of a mobile station and a radio base station apparatus.

Accordingly, the radio base station apparatus 100 controls transmission power of each mobile station with which it conducts communication, making transmission power from each mobile station become the necessity minimum, so that a transmit signal from each mobile station does not interfere with the other mobile stations. Outline of this control will be described referring to FIG. 2 that shows configurations of a mobile station and the radio base station apparatus.

The mobile station 101 comprises: an encoding part 46 for encoding a signal that is to be transmitted; a transmission power control part 44; a variable gain amplifier 45 whose gain is controlled by the transmission power control part 44; an antenna 40 for transmitting a signal from the amplifier 45 to the radio base station apparatus 100; an antenna 41 for receiving a signal from the radio base station apparatus 100; a synchronous detection part 42 that processes a received signal to separate a transmission power control signal and a signal to its own mobile station; and a decoding part 43 for decoding the signal to its own mobile station. Further, the radio base station apparatus 100 comprises: an antenna 10 for receiving transmit signals from all the mobile stations conducting communication within the cell; an interference suppressing part 12 for suppressing interference in the received signal of the antenna 10 for each mobile station; a decoding circuit 13 for decoding a signal from each mobile station; an SIR measuring part 14 for measuring an SIR of a signal from each mobile station after suppressing the interference; a comparing part 47 for comparing the measured SIR value with a target SIR value to generate a transmission power control signal; an encoding part 22 for encoding a signal that is to be transmitted to a mobile station; an adding part 48 for synthesizing a signal to transmit to a mobile station and a transmission power control signal; and an antenna 17 for transmitting the synthesized signal to a mobile station.

Next, operation of the radio base station apparatus 100 for controlling transmission power from the mobile station 101 will be described.

A transmit signal transmitted from the antenna 40 of the mobile station 101 and transmit signals from the other mobile stations 102–10n are received by the antenna 10 of the radio base station apparatus 100 and sent to the interference suppressing part 12. The interference suppressing receiving part 12 detects received data of the mobile station 101 by suppressing interference power of the mobile stations 102–10n in the received signal. The detected received signal from the mobile station 101 is sent to the SIR measuring part 14 and to the decoding part 13. The received signal inputted to the decoding part 13 is decoded and used as the received data. On the other hand, the SIR measuring part 14, to which the same received signal is inputted, measures the SIR of the received signal, and transfers the SIR value to the comparing part 47. The comparing part 47 compares the measured SIR value with the target SIR value of the mobile station 101, and, based on the result, generates a transmission power control signal meaning an instruction of increasing or decreasing the transmission power. Then, the comparing part 47 transfers the transmission power control signal to the adding part 48.

Transmit data to the mobile station is encoded by the encoding part 22 and transferred to the adding part 48. The adding part 48 adds the transmission power control signal inputted from the comparing part 47, to the transmit signal inputted from the encoding part 22. The transmit signal added with the transmission power control signal is transmitted through the antenna 17.

Through the antenna 41, the mobile station 101 receives the signal transmitted from the radio base station apparatus 100, and sends the received signal to the synchronous detection part 42. The synchronous detection part 42 performs the synchronous detection on the received signal, to separate the transmission power control signal from the received signal. The received signal from which the transmission power control signal has been separated is transferred to the decoding part 43, and then, demodulated to be used as the received data. On the other hand, the transmission power control signal is transferred to the transmission power control part 44. When the result of decoding the transmission power control signal means the instruction of increasing the transmission power, the transmission power control part 44 suitably controls the gain of the variable gain amplifier 45 such that the increase of power instructed by the radio base station apparatus 100 is realized. On the other hand, when the result of decoding means the instruction of decreasing the transmission power, the transmission power control part 44 controls the gain of the variable gain amplifier 45 such that the decrease of power is realized.

Transmit data to transmit from the mobile station 101 is encoded by the encoding part 46, and inputted to the variable gain amplifier 45. The variable gain amplifier 45 amplifies the transmit signal to the power controlled by the transmission power control part 44, and transfers the amplified signal to the antenna 40 through which the signal is transmitted.

Next, referring to FIG. 3, details and operation of the radio base station apparatus will be described.

The radio base station apparatus 100 comprises: the antennas 10 and 17 for reception and transmission; a receiving radio module 11 for performing radio frequency/intermediate frequency reception processing; the interference suppressing receiving part 12 that has an interference suppressing function and is constituted by the multistage interference suppressing receiving circuits 120a–120n; detection/decoding parts 13a–13n for detecting and decoding the received signal, the SIR measuring part 14 for measuring a reverse link channel SIR; a SIR estimating part for transmission power control 15, which estimates a transmission power control SIR; a transmission power control signal generating part 16 for comparing the transmission power control SIR and the target SIR to generate a transmission power control signal; encoding parts 22a–22n for performing the process of encoding transmit data; frame generating parts 21a–21n for generating transmit frames; spreading circuits 20a–20n for performing process of spreading transmit frames; an adding circuit 19 for adding transmit signals directed to a plurality of mobile stations; and a transmitting radio module 18.

In the above-described apparatus, a signal transmitted from a mobile station is received through the antenna 10, and then, the receiving radio module 11 performs demodulation of the baseband signal and the reception processing at radio frequency/intermediate frequencies. The received signal outputted from the receiving radio module 11 is inputted to the interference suppressing receiving circuit 120a in the first stage of the interference suppressing receiving part 12. The interference suppressing receiving circuits 120a–120n demodulates the received signal into which transmit signals of a plurality of mobile stations are multiplexed. The demodulation is performed for each mobile station, to generate an interference replica of each mobile station. Next, the interference replicas other than a desired signal are subtracted from the inputted originally received signal, to suppress the interference waves. The received signal from which the interference replicas are subtracted is inputted to the interference suppressing receiving circuit in the next stage, and processed there similarly to the preceding stage. By repeating this operation a plurality of times, the demodulation result of the last stage is improved in signal quality than the demodulation result of the first stage.

The signal outputted from the interference suppressing receiving circuit 120$n$ in the last stage is inputted to each of the detection/decoding parts 13$a$–13$n$, and subjected to error correction control processing such as deinterleaving and Viterbi decoding, to be used as the received data thereafter.

On the other hand, signals 23$a$–23$n$ of respective users outputted from the interference suppressing receiving circuit 120$a$ in the first stage are inputted to the reverse link channel SIR measuring part 14, passing through respective signal lines. The SIR measuring part 14 measures respective SIRs of the received signals inputted through the signal lines 23$a$–23$n$ of the first stage, and inputs the measures SIR values to the SIR estimating part for transmission power control 15, through signal lines 25$a$–25$n$. Similarly, signals outputted from the interference suppressing receiving circuit 120 in the last stage are also inputted to the reverse link channel SIR measuring part 14. The SIR measuring part 14 measures their SIR values and those SIR values are inputted to the SIR estimating part for transmission power control 15.

Figure 4:
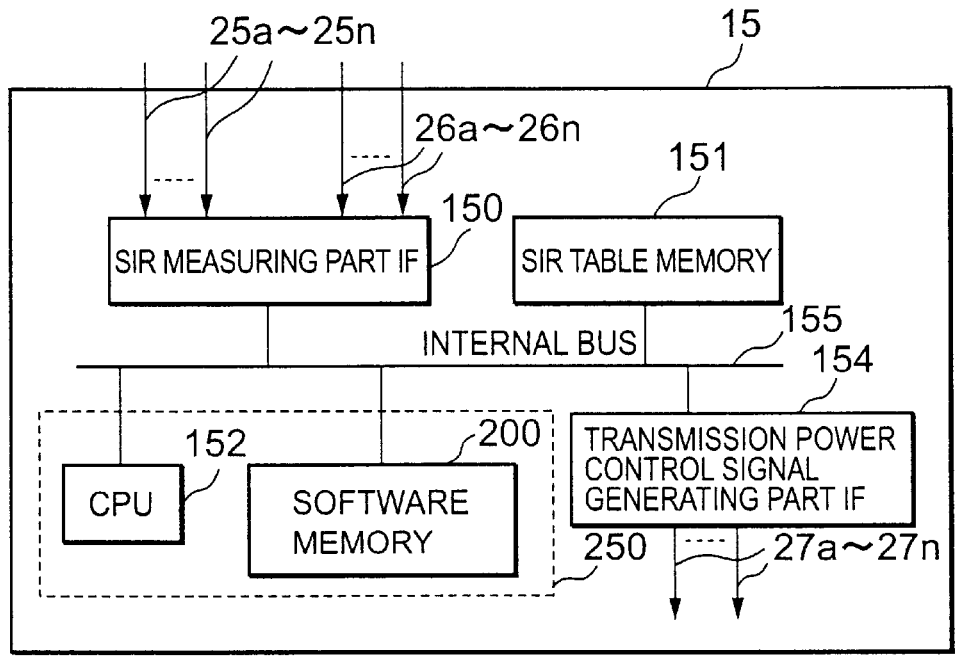
FIG. 4 is a block diagram showing a configuration of a SIR estimating part for transmission power control.
Figure 5:
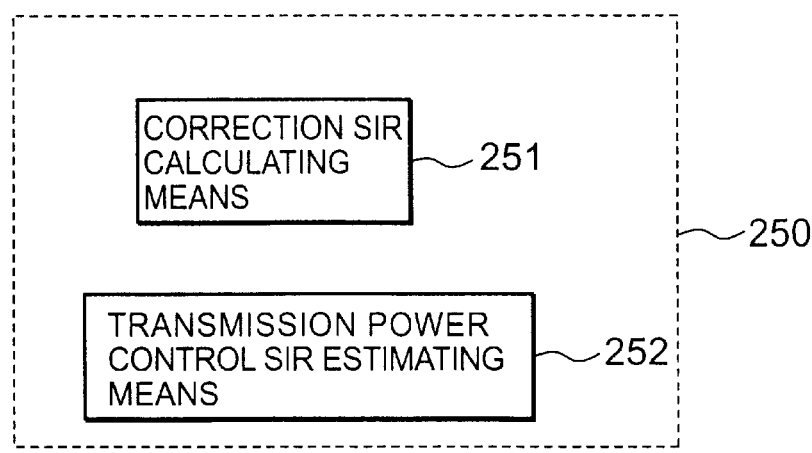
FIG. 5 is a view illustrating a configuration of a correction SIR calculating means and a SIR estimating means for transmission power control.

As shown in FIG. 4, the SIR estimating part for transmission power control 15 comprises: an SIR measuring part IF 150 as an interface with the reverse link channel SIR measuring part 14; an SIR table memory 151 for storing SIR values received from the reverse link channel SIR measuring part 14; a transmission power control signal generating part IF 154 as an interface with the transmission power control signal generating part 16; a software memory 200 storing a transmission power control SIR estimating program; a CPU 152 having functions of controlling various functional blocks and of executing the transmission power control SIR estimating program; and an internal bus 155 connecting the above-mentioned various functional parts with one another. As shown in FIG. 5, the CPU 152 and the software memory 200 implement a correction SIR calculating means 251 and a SIR estimating means for transmission power control 252, and these means constitute an SIR estimation processing part 250. Here, the memory 200 in this case may be physically one memory or a plurality of memories.

When the SIR values (referred to as first stage SIR values) of the signals from the first stage interference suppressing receiving circuit 120$a$ are inputted to the SIR measuring part IF 150 by the reverse link channel SIR measuring part 14 through the signal lines 25$a$–25$n$, the SIR measuring part IF 150 generates an interrupt to the CPU 152. On receiving this interrupt, the CPU 152 stores the first stage SIR values into a predetermined location of the SIR table memory 151, and executes the SIR estimating program for transmission power control stored in the software memory 200. Next, in the course of the execution of the SIR estimating program for transmission power control, the CPU 152 estimates the transmission power control SIR values, using values stored in the SIR table memory 151, i.e., the last correction A SIR and the current first stage SIR values. The estimated SIR values are outputted to the transmission power control signal generating part 16 through the transmission power control signal generating part IF 154.

Further, when the SIR values (referred to as the latter stage SIR values) of the signals from the latter stage interference suppressing receiving circuit 120$n$ are inputted to the SIR measuring part IF 150 by the reverse link channel SIR measuring part 14 through the signal lines 26$a$–26$n$, the SIR measuring part IF 150 generates an interrupt to the CPU 152 similarly to the above-described case. On receiving this interrupt, the CPU 152 stores the latter stage SIR values into a predetermined location of the SIR table memory 151. In this case, however, the CPU 152 does not estimate the transmission power control SIR.

The estimated transmission power control SIR values are inputted to the transmission power control signal generating part 16 through the signal lines 27$a$–27$n$. The transmission power control signal generating part 16 compares the inputted transmission power control SIR values with target SIR values 17$a$–17$n$ given in advance. When a transmission power control SIR value is greater than the target SIR value, the transmission power control signal generating part 16 generates a transmission power control signal for instructing the mobile station concerned to decrease its transmission power. On the contrary, when an estimated SIR value is smaller than the target SIR value, the transmission power control signal generating part 16 generates a transmission power control signal for instructing the mobile station concerned to increase its transmission power.

The frame generating parts 21$a$–21$n$ add the transmission power control signals, which are inputted from the transmission power control signal generating part 16, to mobile stations' transmit data, which have been subjected to error control processing such as convolutional encoding and interleaving in the encoding parts 22$a$–22$n$. The transmission power control signals are added to the predetermined positions of the data, to construct frames. The spreading circuits 20$a$–20$n$ perform spread spectrum processing using parameters corresponding to the mobile stations, respectively. In order to multiplex the signals directed to the mobile stations, the adding circuit 19 adds the transmit signals. The signal outputted from the adding circuit 19 is subjected to radio frequency modulation in the transmitting radio module 18 and transmitted through the antenna 17.

Next, structure of the SIR table stored in the SIR table memory 151 shown in FIG. 4 and the method of estimating a transmission power control SIR will be described.

The SIR table has the structure shown in FIG. 6. The example shown in FIG. 6 shows only a table for one user, and the SIR table is constituted by three fields, i.e., a first stage SIR value, a latter stage SIR value, and a correction □SIR value. The field of the first stage SIR value stores an SIR value measured from the signal of the interference suppressing receiving circuit 120$a$ in the first stage, and the field of the latter stage SIR value stores an SIR value measured from the signal of the interference suppressing receiving circuit 120$n$ in the latter stage. The field of the correction ΔSIR stores a correction value that is used in estimating a transmission power control SIR. In the case of the example shown in FIG. 6, this correction value is decided as a result of subtracting a former stage SIR value from a latter stage SIR value. These values are stored for each unit slot time in a radio frame.

Figure 7:
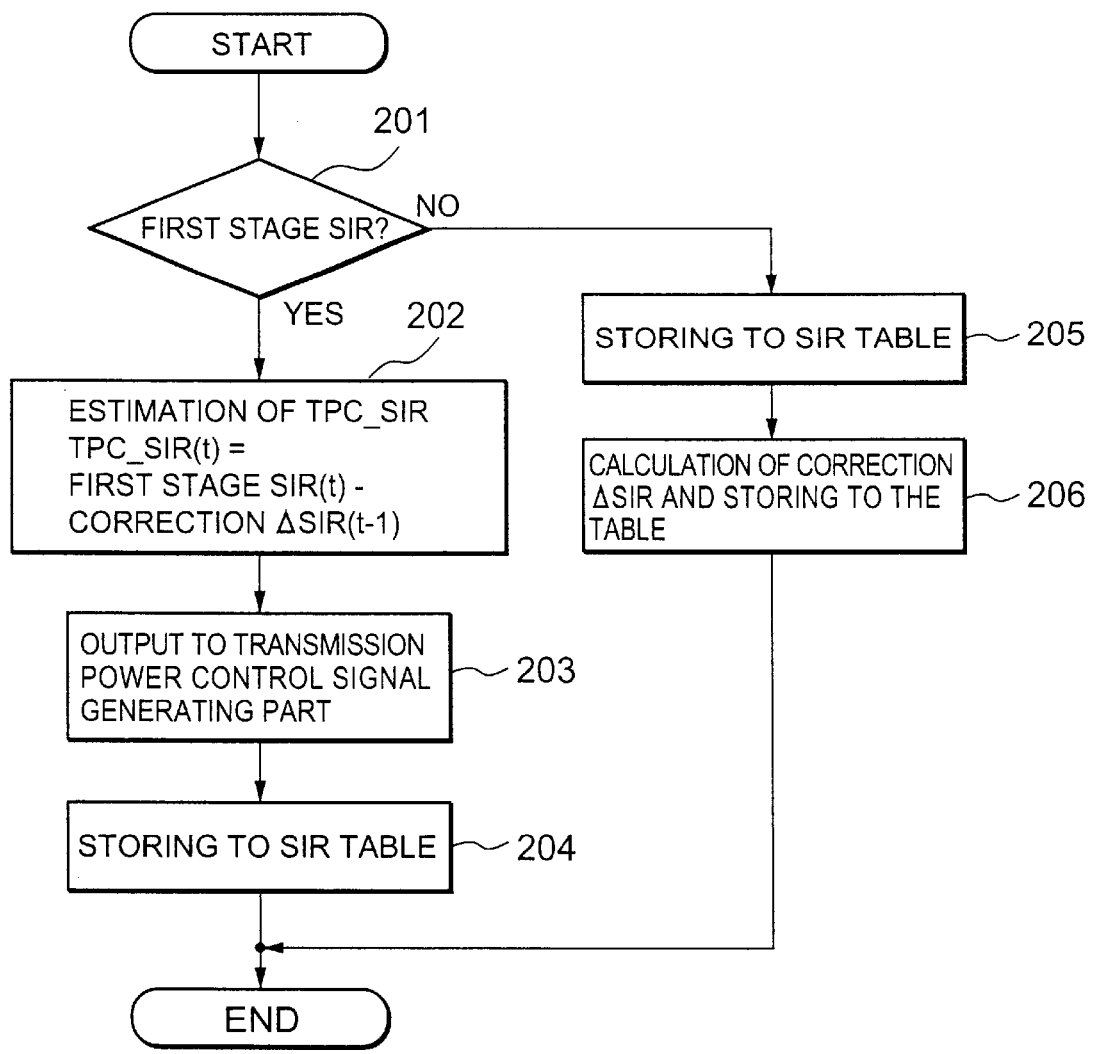
FIG. 7 is a flowchart for explaining processing operation for estimating a transmission power control SIR.

Next, processing operation of the method of estimating the transmission power control SIR value will be described referring to the flowchart shown in FIG. 7. This processing is carried out by the CPU 152 when the SIR estimating program for transmission power control is started by an interrupt from the SIR measuring IF 150 to the CPU 152.

(1) When, at a slot time t, there arises a request for starting the transmission power control SIR estimation processing, it is judged if the requested received data is the first stage SIR value (t) or the latter stage SIR value (t) (Step 201).

(2) When it is judged, at the judgment of Step 201, that the first stage SIR value (t) is requested, the transmission power control SIR value (t) is estimated. This estimation is carried out by calculating the Transmission Power Control (hereinafter, referred to as TPC) SIR, i.e., TPC_SIR (t), by subtracting a correction ΔSIR (t−1) calculated in the past from the first stage SIR value (t) received, as shown in the following equation (1).

$$TPC\_SIR(t) = \text{first stage SIR (t)} - \text{correction } \Delta SIR\ (t-1) \quad (1)$$

Here, the above-mentioned calculation is started by setting the initial value of the correction ΔSIR to zero (Step 202).

(3) The calculated transmission power control SIR (t) is outputted to the transmission power control signal generating part 16, and the received first stage SIR value (t) is stored to the row of the slot No. t of the first stage SIR field of the SIR table, to finish the processing (Steps 203 and 204).

(4) On the other hand, when it is judged, at the judgment of Step 201, that the latter stage SIR value (t) is requested, that latter stage SIR value (t) is stored to the row of the slot No. t of the latter stage SIR field of the SIR table. Then, the correction ΔSIR(t) is calculated and stored to the row of the slot No. t of the correction ΔSIR field of the SIR table, to finish the processing (Steps 205 and 206).

In the above-described processing, the correction ΔSIR value is defined as the result of subtracting the former stage SIR value from the latter stage SIR value. However, the correction value may be defined as follows. Namely, the difference between the latter stage SIR value and the former stage SIR value is integrated in a certain cycle, and the average for that interval is obtained, to define the obtained average value as the correction value. In that case, the cycle of averaging is set shorter than a cycle of transmission power control operation between the base station apparatus and the base station controller.

Figure 8:
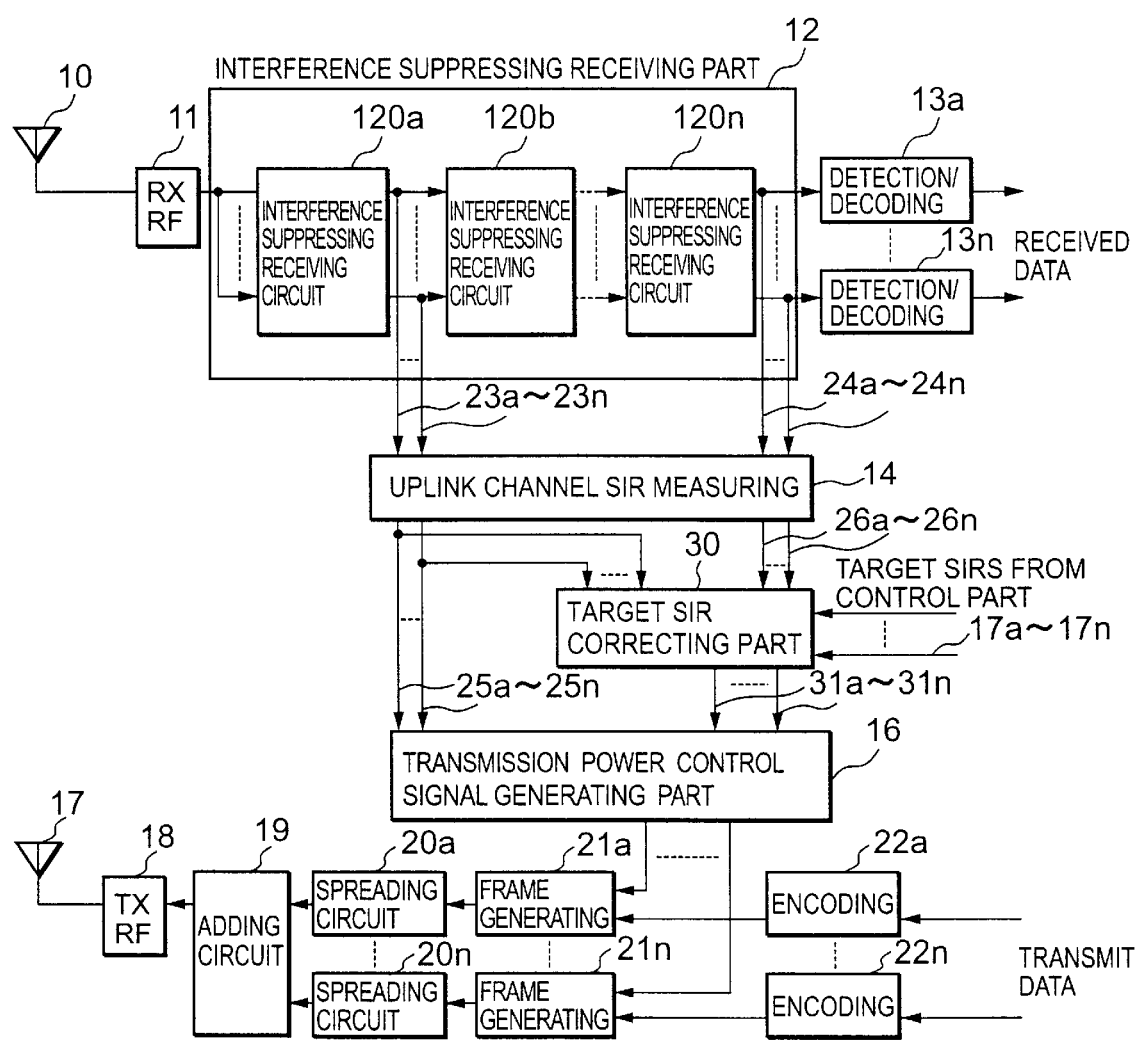
FIG. 8 is a block diagram showing a detailed configuration of a radio base station apparatus according to a second embodiment of the present invention.
Figure 9:
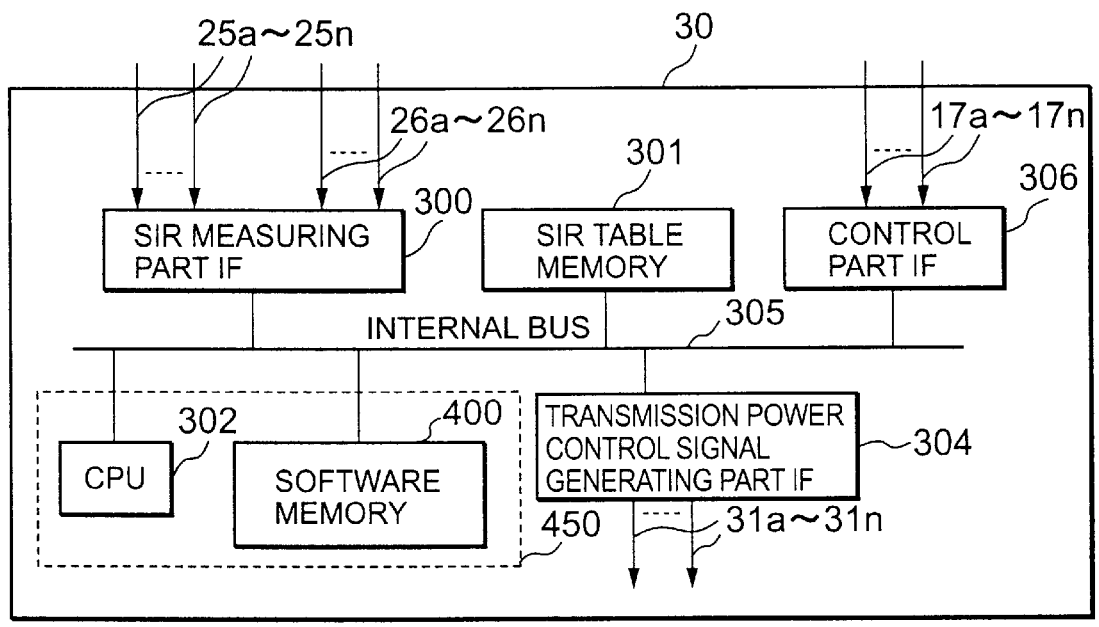
FIG. 9 is a block diagram showing a configuration of a target SIR correcting part.
Figure 10:
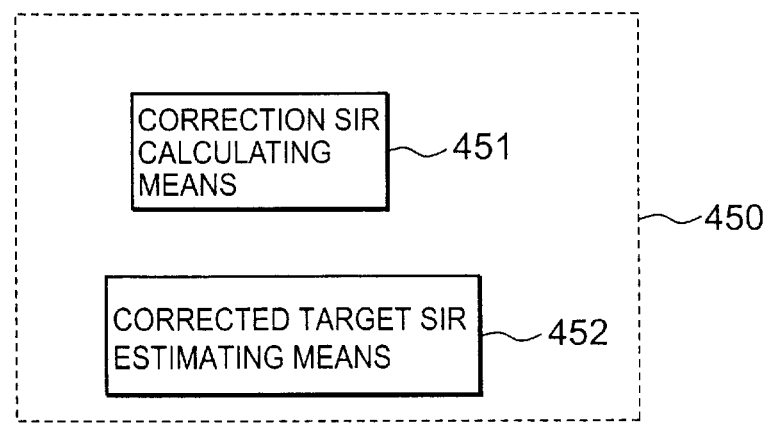
FIG. 10 is a view illustrating a configuration of a correction SIR calculating means and a corrected target SIR estimating means.
Figure 11:
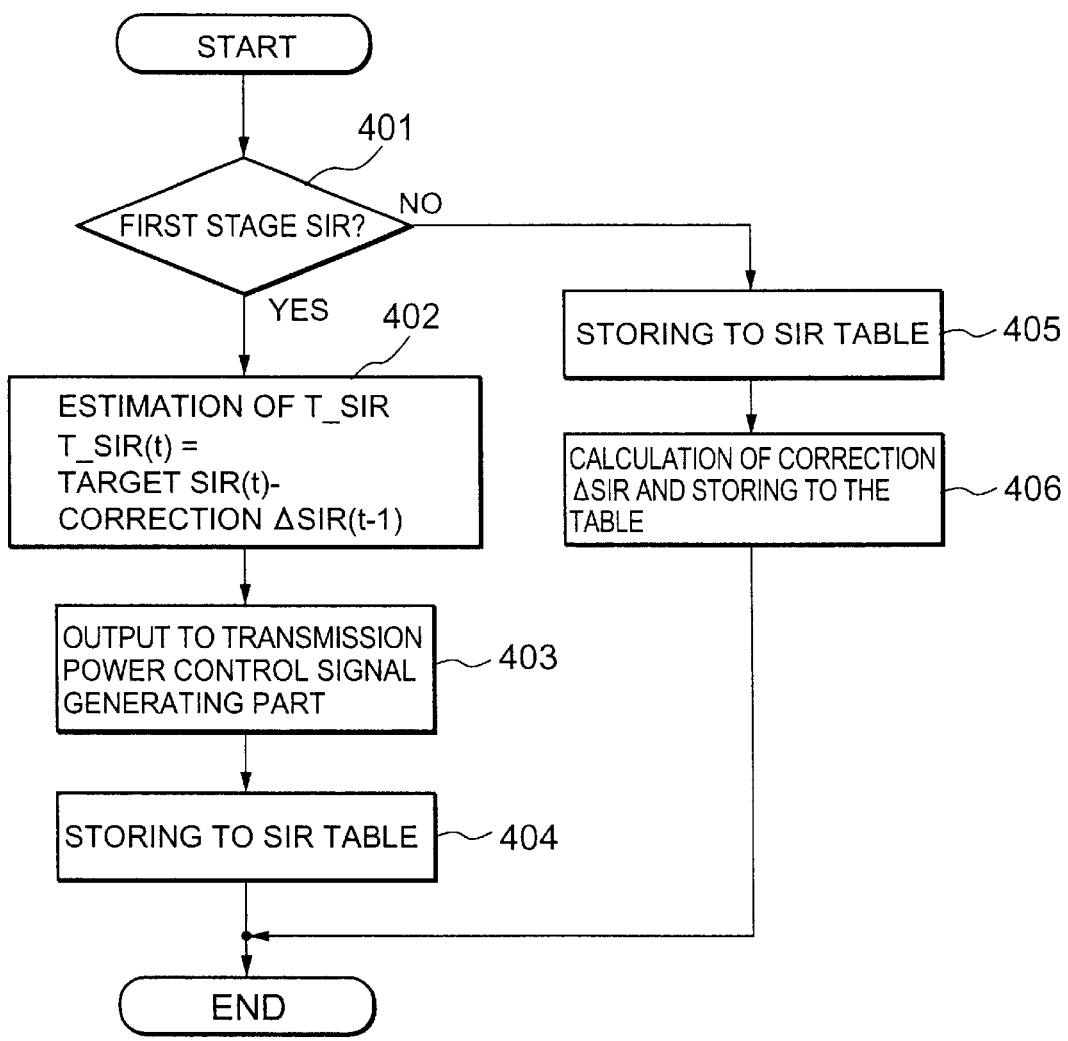
FIG. 11 is a flowchart for explaining processing operation for estimating a corrected target SIR.

FIG. 8 is a block diagram showing a detailed configuration of a radio base station apparatus according to a second embodiment of the present invention; FIG. 9 is a block diagram showing a configuration of a target SIR correcting part; FIG. 10 is a view illustrating a configuration of a correction SIR calculating means and a corrected target SIR estimating means; and FIG. 11 is a flowchart for explaining processing operation for estimating a corrected target SIR. Next, referring to these figures, the second embodiment of the present invention will be described. In FIGS. 8–10, the reference numeral 30 refers to the target SIR correcting part, 300 to an SIR measuring part IF, 301 to an SIR table memory, 302 to a CPU, 304 to a transmission power control signal generating part IF, 306 to a IF-interface, 400 to a software memory, 450 to an SIR estimation processing part, 451 to the correction SIR calculating means, and 452 to a correction target SIR estimating means. The other symbols are same as in FIG. 3.

Figure 3:
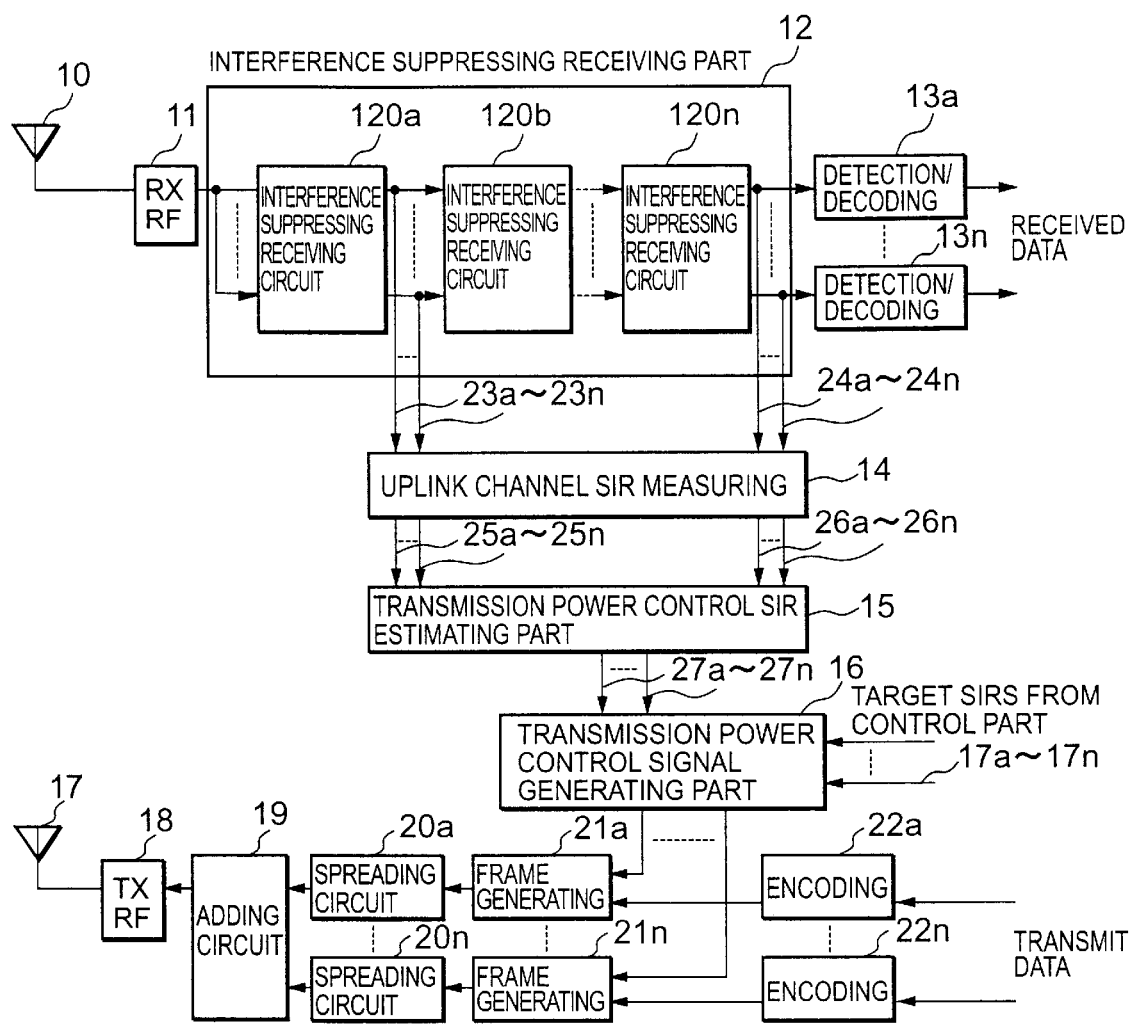
FIG. 3 is a block diagram showing a detailed configuration of a radio base station apparatus according to a first embodiment of the present invention.

Characteristic structure of the radio base station apparatus 100 of FIG. 8 according to the second embodiment of the present invention is that the target SIR correcting part 30 is added to the structure described referring to FIG. 3.

In the radio base station apparatus shown in FIG. 8, first stage SIR values measured by a reverse link channel SIR measuring part 14 are inputted to the target SIR correcting part 30 through signal lines 25a–25n. Further, the latter stage SIR values are inputted to the target SIR correcting part 30 through signal lines 26a–26n. As shown in FIG. 9, the target SIR correcting part 30 comprises: the SIR measuring part IF 300; the SIR table memory 301; the IF-interface 306; the CPU 302; the software memory 400; the transmission power control signal generating part 304; and an internal bus 305 connecting those functional blocks. The CPU 302 and the software memory 400 implement the correction SIR calculating means 451 and the corrected target SIR estimating means 452 shown in FIG. 10, and these means constitute the SIR estimation processing part 450. Here, the memory 400 in this case may be physically one memory or a plurality of memories.

The SIR table memory 301 stores the same SIR table as described referring to FIG. 6. The software memory 400 stores a corrected target SIR estimating program. This program performs processing according to the flow show in FIG. 11. The corrected target SIR estimating program performs processing almost similar to the flowchart of the transmission power SIR estimating program described referring to FIG. 7, except for the processing of Step 402. The corrected target SIR estimation processing in Step 402 calculates an estimate of a corrected target SIR by subtracting a correction ΔSIR from a target SIR received by the IF-interface 306. In Step 403, the obtained corrected target SIR value is outputted by the transmission power control signal generating part IF 304 to the transmission power control signal generating part 16.

The transmission power control signal generating part 16 compares the first stage SIR values inputted from the reverse link channel SIR measuring part 14 through the signal lines 25a–25n with the corrected target SIR values inputted from the target SIR correcting part 30, generates the transmission power control signals based on the results of comparison, and outputs the generated transmission power control signals to the frame generating parts 21a–21n.

In the radio base station apparatuses in the above-described first and second embodiments of the present invention, the signals of the first and last interference suppressing receiving circuits are used for measuring SIRs. However, in the present invention, instead of the signals of the interference suppressing receiving circuit in the first stage, signals of an interference suppressing circuit in a later stage than the first stage or signals of an interference suppressing circuit in a former stage than the last stage may be used.

Here, will be described briefly a difference between the transmission power control based on the past correction ΔSIR, which has been described in the first embodiment, and the transmission power control based on the corrected target SIR, which has been used in the second embodiment. In the control based on the past correction ΔSIR, comparison with the target SIR value is made for each mobile station, to obtain a degree of lowering the transmission power of each mobile station. On the other hand, in the control based on the corrected target SIR, the target SIR value itself is decreased. Namely, that is the value expressing the average degree of lowering the power for a plurality of mobile stations connected to the base station.

Figure 12:
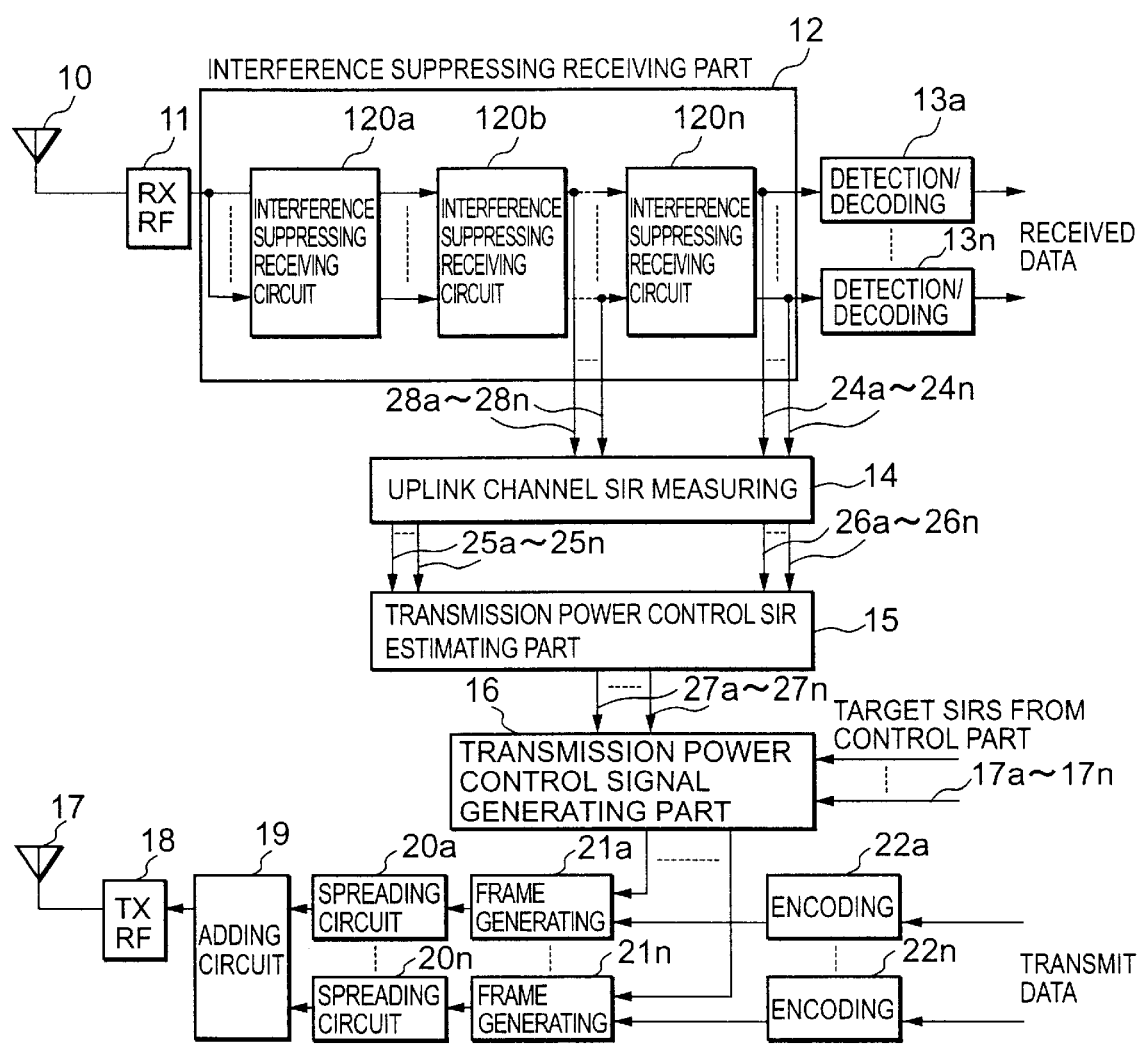
FIG. 12 is a block diagram showing a detailed configuration of a radio base station apparatus according to a third embodiment of the present invention.
Figure 13:
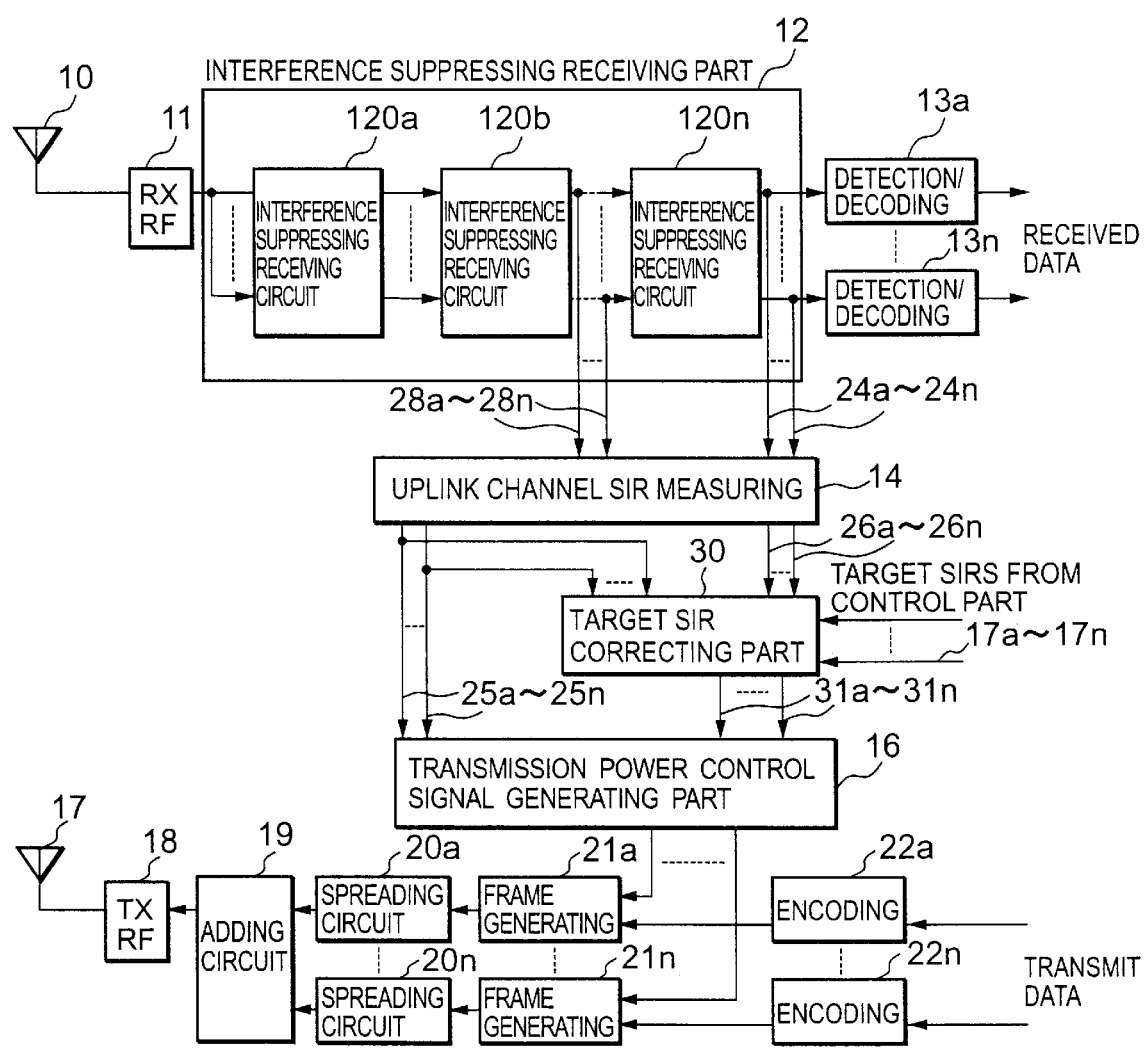
FIG. 13 is a block diagram showing a detailed configuration of a radio base station apparatus according to a fourth embodiment of the present invention.

FIGS. 12 and 13 are block diagrams showing detailed configurations of the radio base station apparatuses according to third and fourth embodiments of the present invention. The radio base station apparatuses according to the third and fourth embodiments of the present invention are examples in which the measuring of SIR is performed using signals of some interference suppressing receiving circuit after the first stage and before the last stage. Namely, in these examples, signals received from the second stage in the interference suppressing receiving part through signal lines 28a–28n and the signals from the interference suppressing receiving circuit in the last stage are used for measuring SIRs.

According to each embodiment of the present invention, it is possible to solve the problems of the conventional techniques. Namely, the interference suppressing effect can be improved while transmission power can be controlled with a smaller processing delay. As a result, according to the above-described embodiments of the present invention, it is possible to efficiently increase the number of mobile stations that can be connected at the same time, and to efficiently utilize the radio resources of the system as a whole.

As described above, the present invention can improve the interference suppressing effect and can control transmission power with a smaller processing delay.

What is claimed is:

1. A base station apparatus in a mobile communication system including a plurality of mobile stations and a plurality of base station apparatuses each having an interference suppressing receiving part containing interference suppressing circuits in a plurality of stages, said base station apparatus comprising:

a calculator for calculating a correction signal-to-interference (SIR) ratio value based on a SIR value measured from a received signal subjected to interference suppression by an interference suppressing receiving circuit in a former stage in said interference suppressing receiving part and a SIR value of the received signal subjected to interference suppression by an interference suppressing receiving circuit in a later stage;

means for estimating a transmission power control SIR value based on the calculated correction SIR value;

a signal generator for generating a transmission power control signal using the estimated transmission power control SIR value; and a transmission power controller for adding said generated transmission power control signal to a downlink frame to control transmission power of a mobile station, wherein said correction SIR value is a value calculated by subtracting an SIR value (former stage SIR value) of the received signal subjected to the interference suppression by the interference suppressing receiving circuit in the former stage from the SIR value (later stage SIR value) of the received signal subjected to the interference suppression by the interference suppressing circuit in the later stage, or by taking an average from an integral of a difference between the later stage SIR value and the former stage SIR value in a certain cycle.

2. The base station apparatus according to claim 1, wherein said transmission power control SIR value is calculated by subtracting the correction SIR value from the former stage SIR value; and wherein said transmission power control signal is generated based on a result of comparison between said transmission power control SIR value and a target SIR value.

3. The base station apparatus according to claim 1, wherein said transmission power control SIR value is calculated by subtracting the correction SIR value from the former stage SIR value; and wherein said transmission power control signal is generated based on a result of comparison between said transmission power control SIR value and a target SIR value.

4. The base station apparatus according to claim 1, wherein said former stage SIR value is an SIR value measured based on the received signal outputted from one of interference suppressing receiving circuits in a first stage through a stage preceding a last stage of said interference suppressing receiving part containing interference 6 suppressing circuits in a plurality of stages.

5. The base station apparatus according to claim 1, wherein said certain cycle in which said average is taken is shorter than a cycle of transmission power control operation between the base station apparatus and a base station controller.

6. A base station apparatus in a mobile communication system including a plurality of mobile stations and a plurality of base station apparatuses each having an interference suppressing receiving part containing interference suppressing circuits in a plurality of stages, said base station apparatus comprising:

a calculator for calculating a correction signal-to-interference (SIR) ratio value based on a SIR value measured from a received signal subjected to interference suppression by an interference suppressing receiving circuit in a former stage in said interference suppressing receiving part and an SIR value of the received signal subjected to interference suppression by an interference suppressing receiving circuit in a later stage;

means for estimating a corrected target SIR value based on the calculated correction SIR value;

a signal generator for generating a transmission power control signal using the estimated correction target SIR value; and a transmission power controller for adding said generated transmission power control signal to a downlink frame, to control transmission power of a mobile station, wherein said correction SIR value is a value calculated by subtracting an SIR value (former stage SIR value) of the received signal subjected to the interference suppression by the interference suppressing receiving circuit in the former stage from the SIR value (later stage SIR value) of the received signal subjected to the interference suppression by the interference suppressing circuit in the later stage, or by taking an average from an integral of a difference between the later stage SIR value and the former stage SIR value in a certain cycle.

7. The base station apparatus according to claim 6, wherein said corrected target SIR value is calculated by subtracting the correction SIR value from a target SIR value; and wherein said transmission power control signal is generated based on a result of comparison between said former stage SIR value and the 6 corrected target SIR value.

8. The base station apparatus according to claim 6, wherein said corrected target SIR value is calculated by subtracting the correction SIR value from a target SIR value; and wherein said transmission power control signal is generated based on a result of comparison between said former stage SIR value and the 6 corrected target SIR value.

9. The base station apparatus according to claim 6, wherein said certain cycle in which said average is taken is shorter than a cycle of transmission power control operation between the base station apparatus and a base station controller.

* * * * *